G. B. DOUGLAS & L. C. WEMPLE.
MOWER.

No. 189,709. Patented April 17, 1877.

Witnesses:
Heinrich F. Bruns
O. W. Bond

Inventors:
Geo. B. Douglas
Leonard C. Wemple

UNITED STATES PATENT OFFICE.

GEORGE B. DOUGLAS AND LEONARD C. WEMPLE, OF EVANSTON, ILLINOIS, ASSIGNORS OF TWO-THIRDS THEIR RIGHT TO THOMAS K. ELVEY, OF SAME PLACE.

IMPROVEMENT IN MOWERS.

Specification forming part of Letters Patent No. 189,709, dated April 17, 1877; application filed June 24, 1876.

*To all whom it may concern:*

Be it known that we, GEORGE B. DOUGLAS and LEONARD C. WEMPLE, of Evanston, Cook county, State of Illinois, have invented new and useful Improvements in Grain and Grass Harvesters, of which the following is a full description, reference being had to the accompanying drawings, in which—

Figure 1:
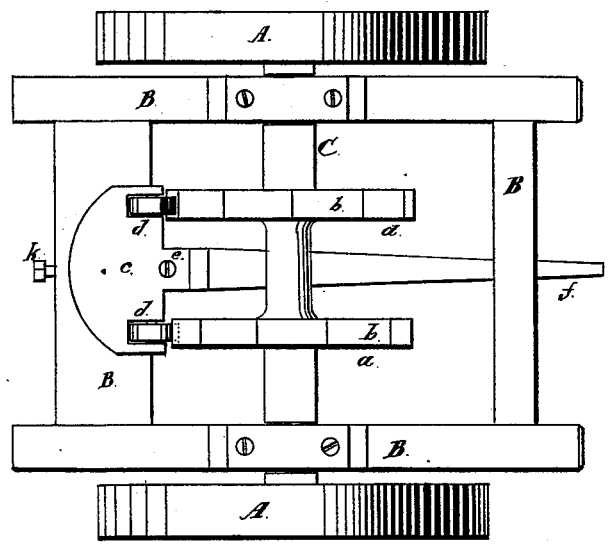
Figure 2:
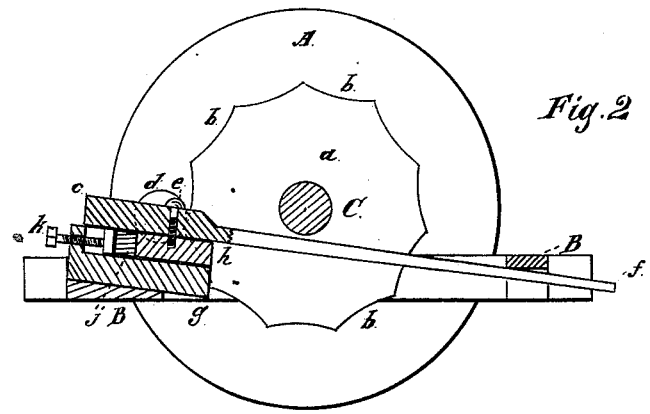
Figure 3:
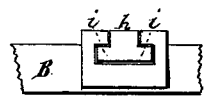

Figure 1 is a top or plan view; Fig. 2, a longitudinal section; Fig. 3, an end view of the pivot-box.

The object of this invention is to furnish an improved device for operating the sickle or knife of a grain or grass harvester without the use or employment of gearing; and its nature consists in providing a head operated independently on each side thereof by separate wheels, and in the combination of parts hereinafter more fully described and claimed as new.

In the drawings, A represents the driving-wheels of a mowing-machine or harvester; B, the frame mounted upon the driving-wheels; C, the axle or shaft; $a$, the wheels fixed to the shaft; $b$, the projections or cams on the peripheries of the wheels $a$; $c$, the head on the vibrating arm; $d$, the anti-friction wheels; $e$, the pivot; $f$, the vibrating arm; $g$, the pivot-box; $h$, the pivot-slide; $i$, the wings or projection on the side of the slide $h$; $j$, the rubber or other yielding end bearings for the slide $h$; $k$, the set-screw.

The wheels A are made in the usual manner, and one or both are permanently fixed or attached to the axle C so as to cause it to revolve, or attached thereto by ordinary clutches. The frame B is made in any suitable manner, so as to be adapted to the use for which the machine is designed, whether as mower, reaper, or harvester. The wheels $a$ are permanently attached to the axle C, and they may be attached together by a center-piece or not, as desired. The peripheries of these wheels are provided with as many projecting points or cams $b$ as are necessary to produce the desired number of strokes or vibrations of the sickle during one revolution of the main or driving wheel or wheels, and they revolve in the same direction as the main wheels.

These wheels $a$ are so placed upon the axle or shaft C that the points upon one will be exactly opposite the center or lowest place between the points of the other, as shown in Fig. 1. The head $c$ is provided with two anti-friction rollers or wheels, $d$, which bear upon or press against the peripheries of the wheels $a$ in such a manner that when one of the said rollers is upon the point of the cam $b$ of one wheel, the other roller, $d$, is upon the depression equidistant between the points of the other wheel $a$. This vibrating head $c$ is pivoted at $e$ on a line or nearly on a line with the point of contact between the wheels $a$ and the rollers $d$, and is firmly attached to or made a part of the vibrating arm $f$. The pivot $e$ passes through the head $c$, and is attached to the slide $h$ in such a manner that by moving the slide the head $c$ can be set up to compensate for any wear of the parts or set back to ease the movement and prevent the machine from running too hard.

At the rear of the slide $h$ in the pivot-box $g$ is placed a rubber or other elastic cushion, $j$, which will ease the movement in passing any irregularities or imperfections in the construction or hanging of the wheels $a$ or rollers $d$, and also hold the rollers $d$ up to their work so as to cause them to give an equal stroke to the vibrating bar $f$, notwithstanding any irregularities of wear or imperfection of construction. As shown, this compensating spring or cushion is a simple piece of rubber placed in the pivot-box. In construction it will be properly cased in by a metal cylinder and plunger or other suitable device to prevent unnecessary wear, and to keep it in proper position. This spring or elastic cushion $j$ is backed up and held in place by a cross-plate and set-screw so that it may be properly adjusted to give the right movement, and also to take up any wear of the parts. As shown, the slide $h$ is provided with wings to prevent the head $c$ from rising out of position in case the machine is turned backward. Suitable flanges may be used in place of these wings over the top of the box, or they may be entirely dispensed with by running the pivot $e$ through the bottom of the box $g$, the box having a slot for that purpose, and for the purpose of enabling the pivot to be moved slightly backward or forward. The vibrating arm $f$ may be attached directly to the sickle, or it may be made to operate it by the use of a pivoted arm or pitman, and the pivot $e$ may be located at a greater or less distance from the line named.

We are aware that many attempts have been made heretofore to adapt a cam movement to the requirements of mowing, reaping, and harvesting machines, but great trouble and annoyance have been experienced from the fact that the angle of the cam was necessarily so great that the devices for operating the arm or lever would "hammer" to such a degree that in a short time much wear and lost motion would be observable, thus rendering them unfit for their work. By the use of two cam-wheels, $a$, constructed in the manner described, we are enabled to use the elastic cushion or presser $j$ before mentioned, and thus by the pressure given by the screw $k$ cause the anti-friction rollers $d\,d$ to bear at all times upon the edges of the wheels $a\,a$. It is obvious that the device can be used for operating the sickle in any of the various kinds of grain and grass harvesting machines now in use, whether they are front or rear cutting.

We have shown our device for converting rotary into reciprocating or vibrating movements as applied to a grain and grass harvester, but it is adapted to be used in various other machines where such change of movement is necessary or desirable, and is also adapted to operate an ordinary sickle in a lawn-mower.

What we claim as new, and desire to secure by Letters Patent, is as follows:

1. The cushion or spring $j$, in combination with the box $g$, sliding bar $h$, and set-screw $k$, substantially as and for the purpose set forth.

2. The combination of the wheels $a\,a$, crosshead $c$, bar $f$, and rollers $d$, with the sliding bar $h$, spring or elastic cushion $j$, and set-screw $k$, substantially as specified.

GEO. B. DOUGLAS.
LEONARD C. WEMPLE.

Witnesses:
L. L. BOND,
O. W. BOND.